US010780300B2

(12) United States Patent
Warren

(10) Patent No.: US 10,780,300 B2
(45) Date of Patent: Sep. 22, 2020

(54) STEP-BOLT ADAPTOR

(71) Applicant: Rapid Rail International Limited, Llanyvaron (GB)

(72) Inventor: Adam Warren, Bristol (GB)

(73) Assignee: Rapid Rail International Limited, Llanyvaron (GB)

( * ) Notice: Subject to any disclaimer, the term of this patent is extended or adjusted under 35 U.S.C. 154(b) by 0 days.

(21) Appl. No.: 15/573,361

(22) PCT Filed: May 11, 2016

(86) PCT No.: PCT/GB2016/051356
§ 371 (c)(1),
(2) Date: Nov. 10, 2017

(87) PCT Pub. No.: WO2016/181145
PCT Pub. Date: Nov. 17, 2016

(65) Prior Publication Data
US 2018/0133526 A1    May 17, 2018

(30) Foreign Application Priority Data

May 13, 2015 (GB) .................................. 1508161.5

(51) Int. Cl.
*F16B 2/08* (2006.01)
*A62B 35/00* (2006.01)
(Continued)

(52) U.S. Cl.
CPC ............ *A62B 35/0068* (2013.01); *E06C 7/18* (2013.01); *E06C 9/04* (2013.01); *F16B 2/08* (2013.01); *F16B 2/065* (2013.01); *F16B 45/00* (2013.01)

(58) Field of Classification Search
USPC ........................................................ 248/343
See application file for complete search history.

(56) References Cited

U.S. PATENT DOCUMENTS 1,588,566 A * 6/1926 Wismer .................... E06C 9/04
144/307
1,953,860 A * 4/1934 Kraatz ................... F16G 11/046
24/115 R
(Continued)

FOREIGN PATENT DOCUMENTS

JP    S52101200 U    8/1977
JP    S54108600 U    7/1979
(Continued)

OTHER PUBLICATIONS

Styles-Davis, E, "UK Search Report", prepared for application No. GB1508161.5, dated Sep. 30, 2015, 7 pages.

*Primary Examiner* — Monica E Millner
(74) *Attorney, Agent, or Firm* — Winstead PC

(57) ABSTRACT

The present invention provides a step-bolt adaptor for engagement with an elongate step-bolt attached to a structure, the step-bolt adaptor comprising a body having a step-bolt engagement portion for engagement with a step-bolt; and a support portion extending from the step-bolt engagement portion, the support portion adapted to receive a part of a fall arrest system of a user. The present invention further provides a kit comprising a step-bolt for engagement with a structure and a step bolt adaptor for engagement with the step-bolt.

12 Claims, 4 Drawing Sheets

(51) Int. Cl.
*E06C 9/04* (2006.01)
*E06C 7/18* (2006.01)
*F16B 2/06* (2006.01)
*F16B 45/00* (2006.01)

(56) References Cited

U.S. PATENT DOCUMENTS

| | | | | |
|---|---|---|---|---|
| 2,957,538 | A * | 10/1960 | Pottmeyer | E06C 9/04 182/189 |
| 4,449,612 | A * | 5/1984 | Southard | A63B 27/00 108/152 |
| 4,697,669 | A * | 10/1987 | Bergsten | E06C 9/04 182/189 |
| 4,700,807 | A * | 10/1987 | Kubiak | A63B 27/00 182/189 |
| 5,248,021 | A | 9/1993 | Nichols | |
| 5,544,717 | A * | 8/1996 | White | A62B 35/0068 182/90 |
| 5,624,007 | A * | 4/1997 | Mahaffy | A63B 27/00 182/90 |
| 5,743,353 | A * | 4/1998 | Browning | A63B 27/00 182/92 |
| 5,941,485 | A * | 8/1999 | Davidson | E04H 12/08 248/218.4 |
| 6,378,822 | B1 * | 4/2002 | Franks | E06C 1/34 182/90 |
| 6,439,343 | B1 * | 8/2002 | Jorges | E06C 9/04 182/187 |
| 6,779,316 | B2 * | 8/2004 | Carroll | E04G 21/3261 411/340 |
| 7,134,524 | B2 * | 11/2006 | Sprague | A01M 31/00 182/92 |
| D631,981 | S * | 2/2011 | Henry | D25/69 |
| 8,387,752 | B2 * | 3/2013 | Lagerstedt | A62B 1/04 182/87 |
| 8,863,900 | B1 * | 10/2014 | Bolinger | A63B 27/00 182/151 |
| 9,409,055 | B1 * | 8/2016 | Niemela | A63B 27/00 |
| 9,856,900 | B1 * | 1/2018 | Strange | F16B 33/00 |
| 2002/0121406 | A1 * | 9/2002 | Summers | E06C 9/04 182/92 |
| 2005/0040303 | A1 * | 2/2005 | Diggle | E06C 1/34 248/210 |
| 2009/0045012 | A1 * | 2/2009 | Mencl | A63B 27/00 182/92 |

FOREIGN PATENT DOCUMENTS

| | | |
|---|---|---|
| JP | S5529658 U | 2/1980 |
| JP | S5529657 U | 3/1980 |
| JP | S57163256 U | 10/1982 |
| SE | 529272 C2 | 6/2007 |
| WO | WO-2004/076870 A1 | 9/2004 |

* cited by examiner

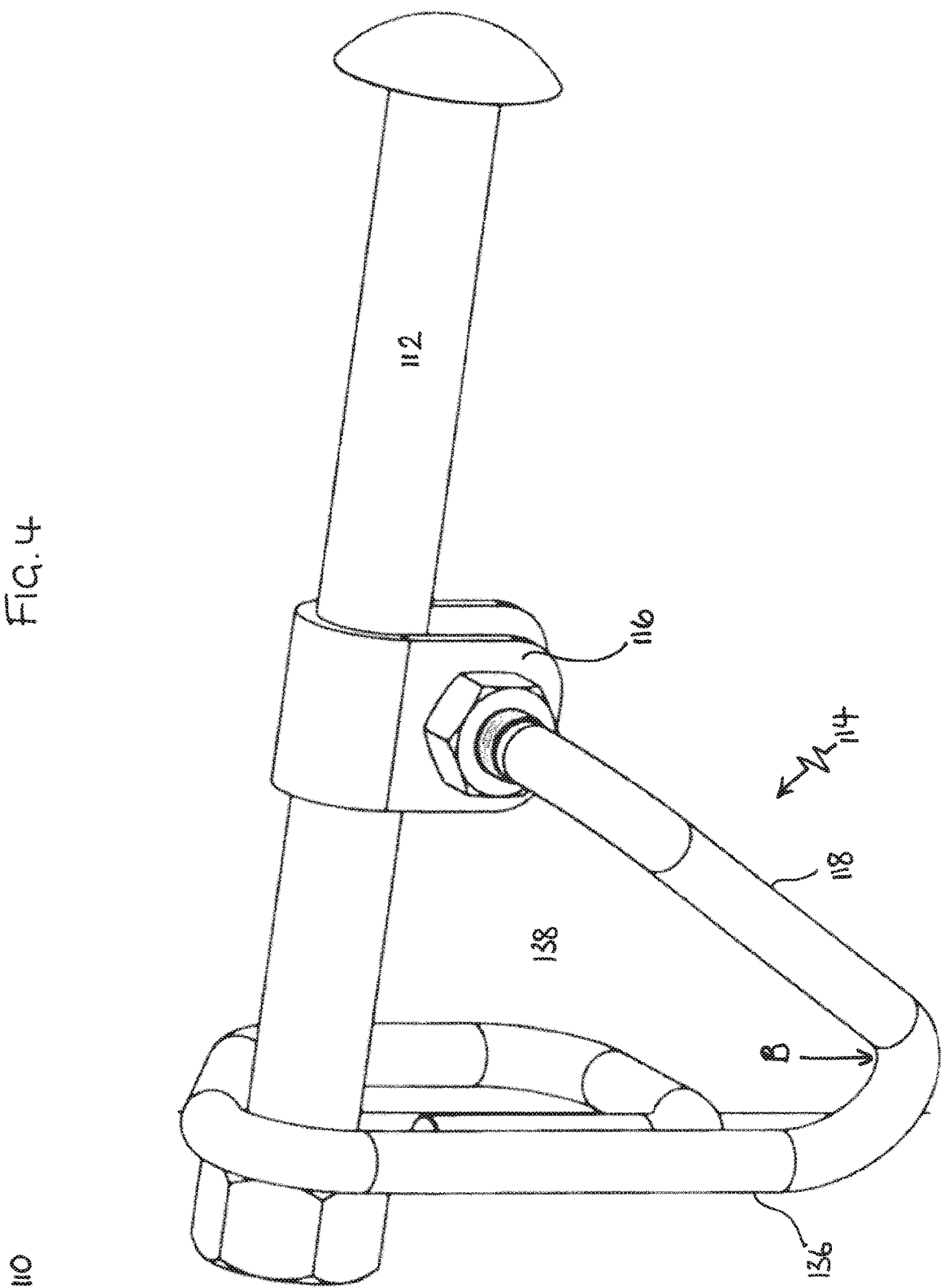

STEP-BOLT ADAPTOR

The present invention relates to an adaptor for engagement with a step-bolt to provide an attachment point for a fall arrest system of a user.

Steel communication and electrical transmission towers require regular inspection and/or maintenance and linesmen are employed to climb the towers and carry out any necessary inspection or maintenance work required. They climb the tower by means of access ladders secured to the tower, or more commonly, by means of step-bolts provided at regular intervals up the tower structure. These step-bolts typically have an un-threaded shank, or step length, of between 6" and 10".

Recent changes in regulations in the US limit the free-fall distance of linesmen operating at height to a maximum of 6 feet and that, in the event of a fall, there should not be any impact with a lower level. Although it is permitted to provide linesmen operating at height with a short twin lanyard of up to 3 feet in length, to limit fall distance, the lanyard must be anchored to the structure. This is typically done by connecting the lanyards to anchor points on the tower using karabiners and snap hooks.

In order to achieve suitable anchor points, new dedicated anchors can be attached to towers. However, this is an expensive and time-consuming process.

Alternatively, it is possible to use existing step-bolt structures as anchor points, provided that the step-bolts have been certified as being capable of withstanding twice the expected maximum fall arrest force. The maximum expected fall arrest force is 1800 lbf (8 kN), but the anchor must be capable of withstanding a static load of 5,000 lbf (22.2 kN).

However, the use of step-bolts as anchor points carries safety concerns with respect to the strength of existing step-bolts and how to control the application of the arrest force to the step-bolt. It will be appreciated that if a user attached to a step-bolt falls from the tower, the application of an arrest force to the step-bolt may result in the bending of the step-bolt and the associated movement of the lanyard attachment point on the step-bolt sliding along the step-bolt in an uncontrolled direction. This is of particularly concern where the direction of sliding of the lanyard attachment point is along the step-bolt in a direction away from the tower, as the part of the step-bolt distal to the point of attachment to the tower is weaker than at the point of attachment of the step-bolt to the tower.

There is therefore a need for an improved cost-effective, reliable anchor system for towers, which can be used to attach safety systems of linesmen working on the structure.

The present invention seeks to address the problems of the prior art i.e. minimising the bending moment applied to a step-bolt in the event of a fall and/or minimising the time it takes to install onto a step-bolt.

Accordingly, a first aspect of the present invention provides a step-bolt adaptor for engagement with an elongate step-bolt attached to a structure, the step-bolt adaptor comprising a body having a step-bolt engagement portion for engagement with a step-bolt; and a support portion extending from the step-bolt engagement portion, the support portion adapted to receive a part of a fall arrest system of a user.

In one embodiment, the step-bolt adaptor is rigid. In other words, once assembled and secured in place on a structure, has no moving parts. This provides strength and stability to the structure.

Thus, the step-bolt adaptor may be retro-fitted to existing step-bolts, thereby providing safe anchorage points for the safety systems of linesmen working on the tower. Further, the provision of a step-bolt engagement portion means that the point of application of the arrest force relative to the step-bolt can be controlled by controlling the position at which the step-bolt adaptor is engaged with the step-bolt.

In addition, as the step-bolt adaptor is engaged with the step-bolt via the step-bolt engagement portion, the step-bolt adaptor is not free to slide along the step-bolt on application of an arrest force to the support portion and the situation where the arrest force is applied at a point on the step-bolt distal from the tower i.e. at the weakest point of the step-bolt, can be avoided. Controlling this also enables the orientation of the step-bolt adaptor during normal use thereby preventing it from rotating about the step-bolt so as to ensure that in the event of a fall, it will operate as intended.

In one embodiment, the step-bolt engagement portion comprises a U-shaped engagement member defining a portion for engagement with a step-bolt.

Preferably, the step-bolt engagement portion is adapted to extend around a step-bolt. In this way, the step-bolt engagement portion can fit around the step-bolt itself to firmly anchor the step-bolt adaptor to the step-bolt. Although alternative step-bolt engagement portions may be envisaged, such as an arrangement where the step-bolt adaptor is held in place relative to the step-bolt by means of two plates that sandwich the step-bolt therebetween, the provision of a U-shaped engagement member allows both firm engagement with the step-bolt and also the ability to adjust the rotation of the U-shaped engagement member relative to the step-bolt to ensure that the support portion is correctly aligned relative to the tower.

The step-bolt engagement portion may be further provided with securing means to frictionally secure the step-bolt adaptor to a step-bolt.

In one embodiment, the securing means comprises aligned opposing apertures adapted to receive a bolt therethrough.

Preferably, the step bold adaptor further comprises a bolt adapted to extend through aligned opposing apertures and a nut adapted to engage an end of the bolt so as to retain the bolt in position relative to the opposing apertures.

Although the preferred embodiment involves the use of aligned apertures and a nut and bolt connector to secure the step-bolt adaptor in place, it is to be appreciated that alternative securing means may be provided such as, but not limited to, clamping the step-bolt adaptor in place or welding the step-bolt engagement portion to the step-bolt itself.

In a further embodiment, the step-bolt adaptor body comprises a single component. This will improve the ease of manufacture of the step-bolt adaptor and also improve the strength of the adaptor, in use, due to the avoidance of weak points experienced in multi-component products at joints between adjacent components.

In one embodiment, the single component may be rectangular or square in cross-section. In this way, the step-bolt adaptor may be manufactured from a single flat plate of metal, which is subsequently cut and bent to form a step-bolt in accordance with the present invention.

The support portion may comprise a support aperture, such that the karabiner of a linesman's safety system may be passed through the aperture, in use, thereby securing the linesman to the step-bolt adaptor and therefore to the step-bolt of the tower.

Preferably, the support aperture comprises a fall arrest engagement surface adapted for engagement with a fall arrest system. Thus, the karabiner of a linesman, should the linesman fall, will engage with the support aperture by exerting pressure on the fall arrest engagement surface.

Preferably, the fall arrest engagement surface extends towards the step-bolt engagement portion. Thus, one side of the fall arrest engagement surface will be higher than the other and thus, when the karabiner of a linesman exerts an arrest force on the fall arrest engagement surface, the karabiner will slide in a downhill direction. In this way, the specific area on the step-bolt adaptor that absorbs the arrest force may be controlled.

It is preferred that the step-bolt engagement surface is lowest at the part of the surface closest to the tower. This will result in the movement of the karabiner of a linesman across the fall-arrest engagement surface towards the tower on falling, thus the arrest force application point will be closer to the point of anchorage of the step-bolt to the tower i.e. the arrest force will be applied at the strongest part of the step-bolt.

In a preferred embodiment, the step-bolt engagement portion is located at an end of the step-bolt proximal to a structure with which a step-bolt is engaged. This also assists with ensuring that the arrest force from the karabiner of a falling linesman is applied at a stronger part of the step-bolt.

In a further embodiment, the support portion is in contact with a structure with which a step-bolt is engaged. Thus, when an arrest force is applied to the step-bolt adaptor, some of the arrest force will be borne by the step-bolt adaptor, and some of the arrest force will be shared by the tower through the step-bolt support portion.

Although the single component step-bolt adaptor may comprise a single component which has been disclosed above as having a square or rectangular cross-section, alternative arrangements are envisaged. For example, the step-bolt adaptor may comprises a single component support portion in connection with a step-bolt engagement portion. The support portion may be circular in cross-section. This allows the ease of manufacture of the step-bolt adaptor from round wire, which is cut to length and subsequently bent to form the step-bolt support portion.

In one embodiment, the support portion comprises a V-shaped support portion. Thus, when a linesman falls and an arrest force is applied through the safety system karabiner to the support portion of the step-bolt adaptor, the specific point of application of the arrest force can be controlled i.e. the arrest force application point will be at the lowermost point of the V-shaped support portion as the karabiner will be guided to this point on application of force through the karabiner to the support portion.

Preferably, the V-shaped support portion is in contact with a structure with which a step-bolt is engaged. In this way, some of the arrest force applied through the step-bolt adaptor will be shared with the tower via the support portion.

In one embodiment, the V-shaped support portion comprises a first part which is substantially parallel to a structure with which a step-bolt is engaged, and a second part attached to the first part and extending away from a structure to which a step-bolt is engaged. This allows the point of application of the arrest force to be controlled such that, should a linesman fall, the karabiner connecting him to the step-bolt adaptor, and hence the point of applied arrest force, is guided towards the tower i.e. towards the strongest part of the step-bolt.

In a further embodiment, the step-bolt engagement portion is located at an end of a step-bolt distal to a structure with which a step-bolt is engaged. This allows the support portion to be located adjacent the tower such that the arrest force may be shared through the tower.

A further aspect of the present invention provides a kit comprising a step-bolt for engagement with a structure; and a step-bolt adaptor according to a first aspect of the present invention.

Embodiments of the present invention will now be described by way of example only and with reference to the accompanying figures in which:

FIG. 4 is a perspective view from the other side of the embodiment of FIG. 3.

FIGS. 1 and 2 show a step-bolt adaptor in accordance with a first embodiment of the present invention.

Figure 1:
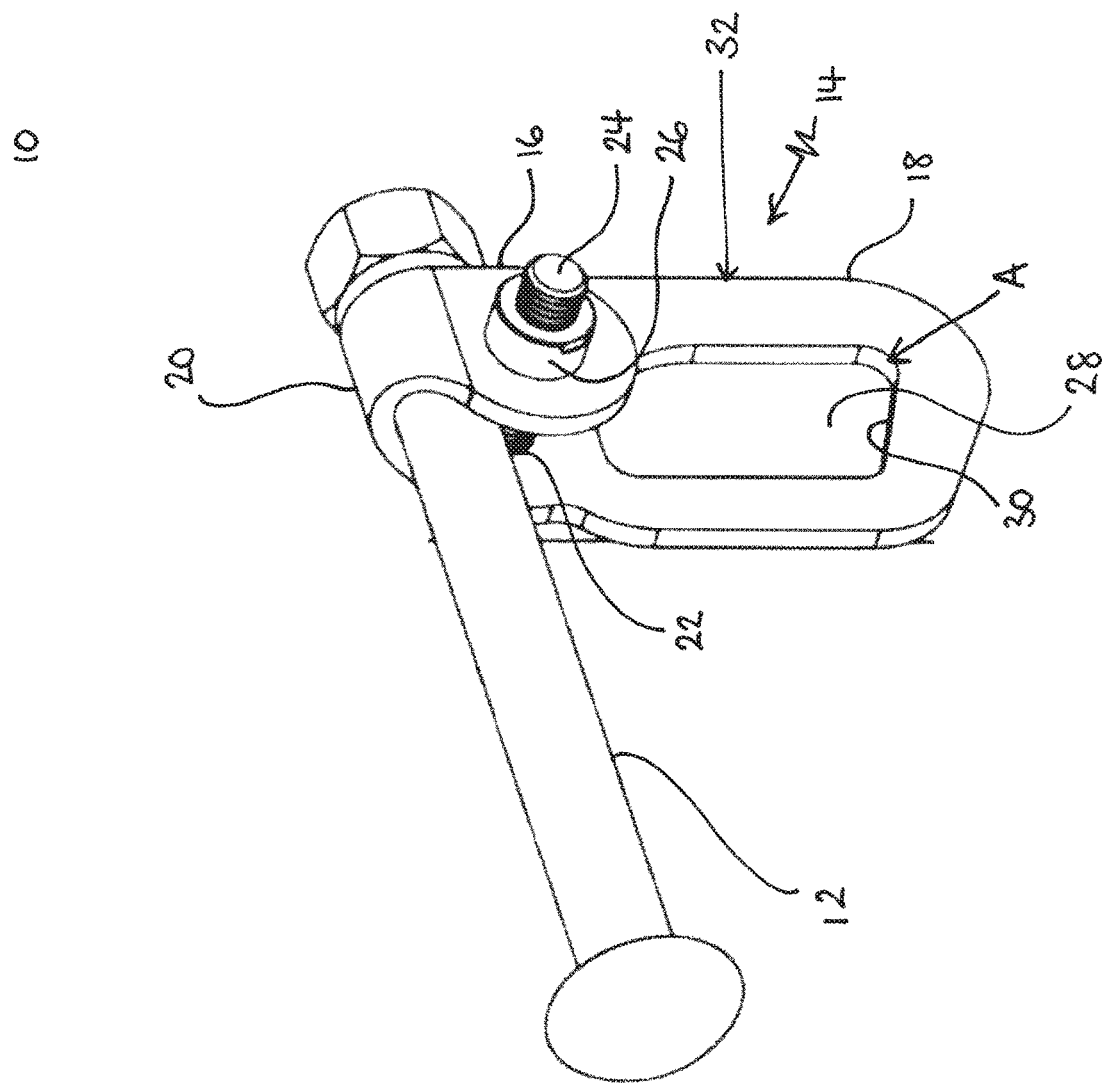
FIG. 1 is a perspective view from a first side of a step-bolt adaptor in accordance with a first embodiment of the present invention.

As shown in the figures, a tower 10 is provided with a step-bolt 12 attached to the tower. A step-bolt adaptor 14 is provided in engagement with the step-bolt, the step-bolt adaptor 14 being formed form a single plate of metal, cut to shape and bent to form the step-bolt adaptor.

Step-bolt adaptor 14 is provided with a step-bolt engagement portion 16 engaged with the step-bolt 12. The step-bolt adaptor 14 is further provided with a support portion 18 for engagement with the karabiner (not shown) of a fall arrest system of a linesman working on tower 10.

The step bold engagement portion 16 comprises a U-shaped portion 20 that extends around step-bolt 12. U-shaped portion 20 is provided with aligned apertures 22, 22' though which a bolt 24 is passed to secure the U-shaped portion 20 around the step-bolt 12. A nut 26 is located at one end of bolt 24 and can be tightened in position to firmly retain bolt 24 in place relative to U-shaped portion 20 and to firmly locate U-shaped portion 20 in place relative to step-bolt 12.

Support portion 18 extends from step-bolt engagement portion 16 and defines an aperture 28 through which a karabiner (not shown) of a fall arrest system of a linesman would be secured, in use. Support portion 18 defines a fall arrest engagement surface 30 which slopes towards tower 10. In addition, support portion 18 defines a tower contact surface 32.

When step-bolt adaptor 14 is located in place on step-bolt 12, bolt 24 is passed through aligned apertures 22, 22' in U-shaped portion 20. Step-bolt adaptor 14 is oriented such that support portion 18 extends downwards from step-bolt engagement portion 16 and tower contact surface 32 makes contact with tower 10. Nut 26 is then tightened so as to apply sufficient force at aligned apertures 22, 22' to firmly hold step bold engagement portion in place on step-bolt 12 and thus to hold tower contact surface 32 in contact with tower 10.

Figure 2:
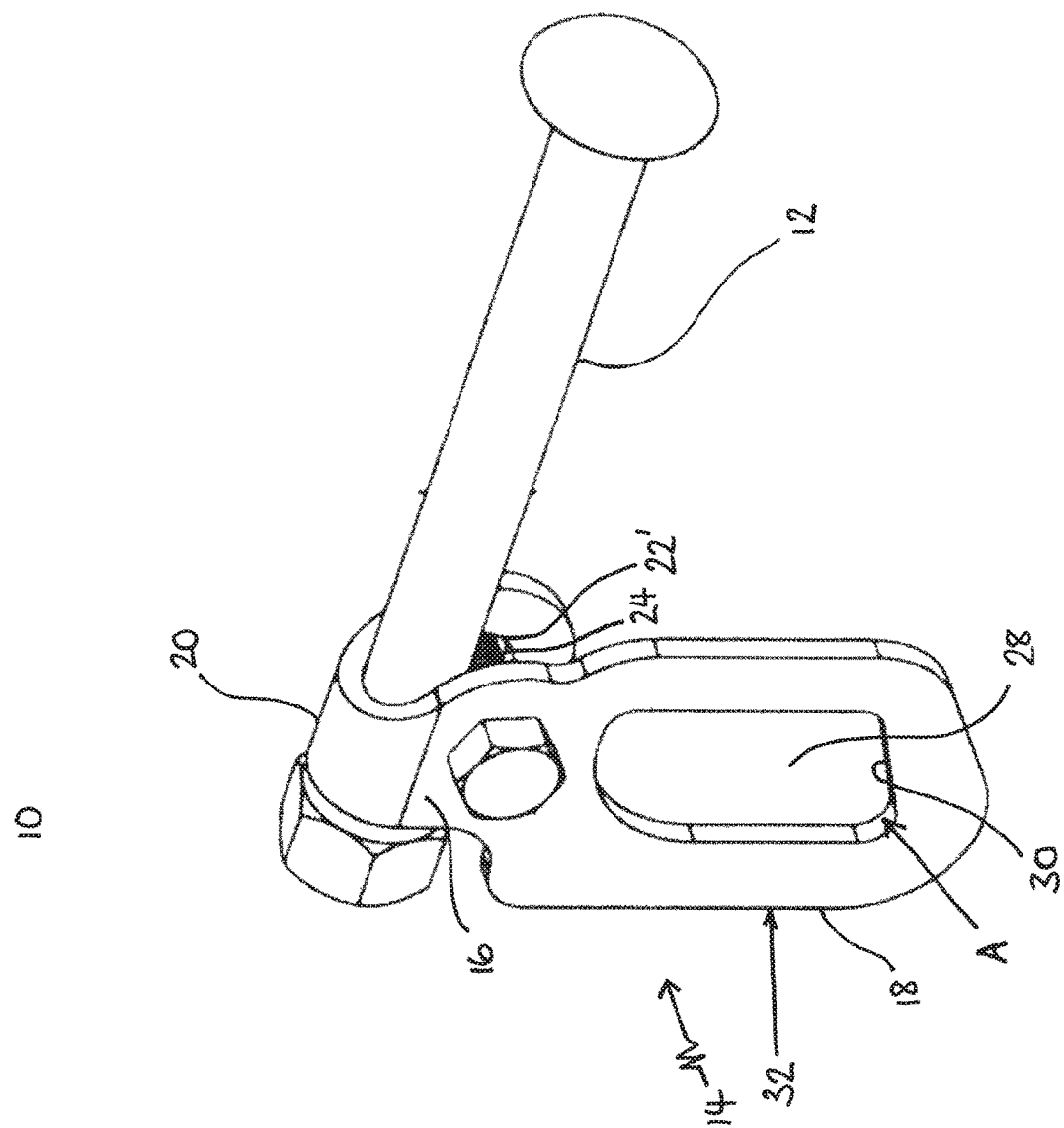
FIG. 2 is a perspective view from the other side of the embodiment of FIG. 1.

A linesman working on tower 10 at a height around step-bolt 12 would attach the karabiner (not shown) of the lanyard of their fall arrest system through aperture 28 of support portion 20. Should the linesman fall, their fall would be arrested when they had fallen the length of their lanyard. The karabiner would then exert a force (the arrest force) at fall arrest engagement surface 30 and the karabiner would be guided to the lowest point of fall arrest engagement surface 30 (shown as A in FIGS. 1 and 2). The arrest force is then controlled to a specific point that is at a point of the step-bolt that is closest to tower 10 i.e. at the point of the step-bolt 12 that is able to bear the greatest force. In addition, as the downward force is applied to the step-bolt adaptor 14, the tower contact surface 32 exerts force on tower 10, thereby reducing the amount of arrest force being absorbed by the step-bolt.

Thus, as described above, step-bolt adaptor 12 can be retro-fitted to existing step-bolts and has the advantages that:
1. it is fitted at the strongest point of the step-bolt i.e. at the point of attachment to tower 10;
2. it controls the point of application of the arrest force by the karabiner of a falling linesman by guiding it towards tower 10 i.e. the strongest point of the step-bolt; and
3. it provides for the absorption of a portion of the arrest force by the tower through the tower contact surface 32.

Figure 3:
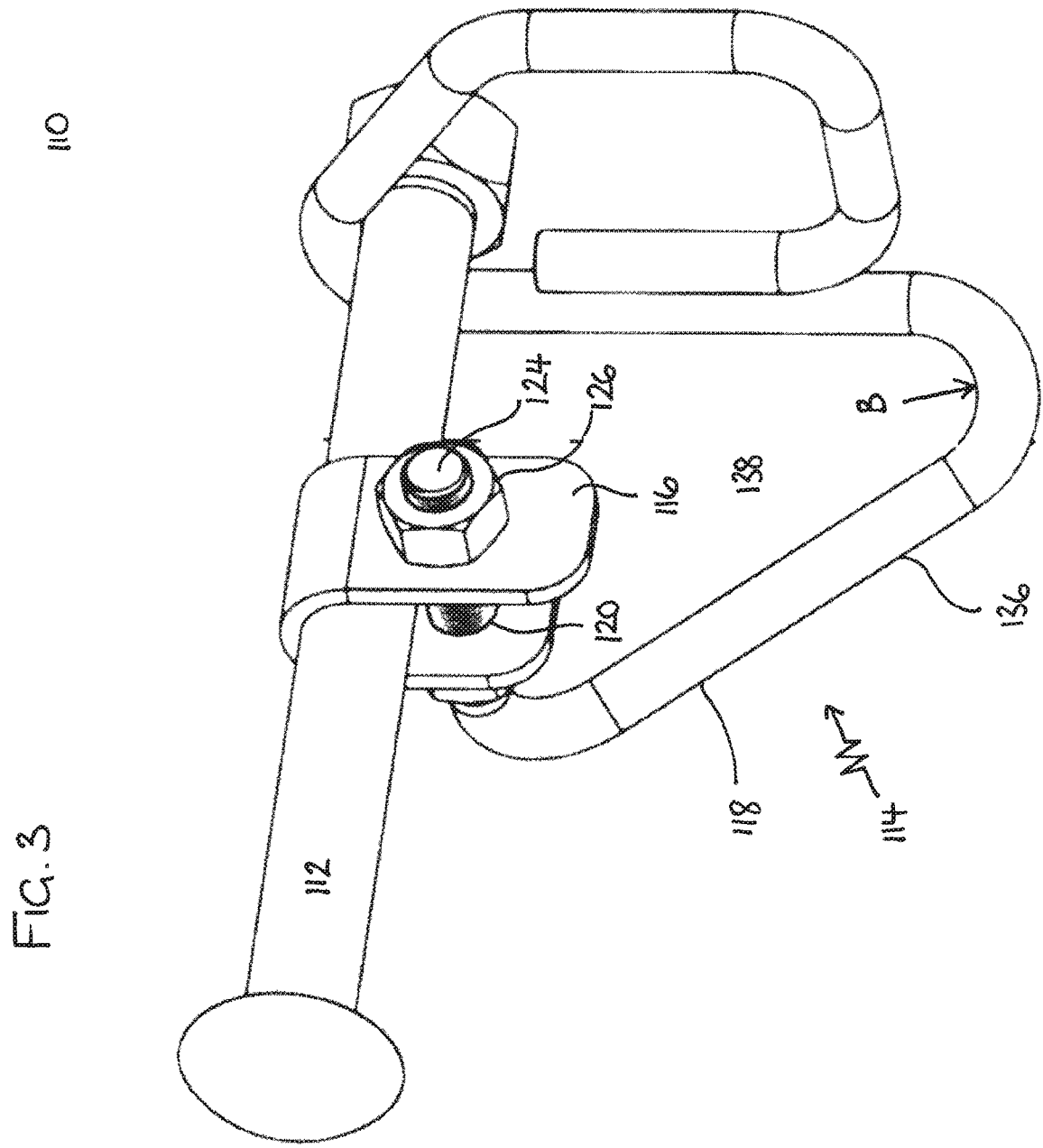
FIG. 3 is a perspective view from a first side of a step-bolt adaptor in accordance with a second embodiment of the present invention.

FIGS. 3 and 4 show a step-bolt adaptor in accordance with a second embodiment of the present invention.

As shown in the figures, a tower 110 is provided with a step-bolt 112 attached to the tower. A step-bolt adaptor 114 is provided in engagement with the step-bolt 112.

Step-bolt adaptor 114 is provided with a step-bolt engagement portion 116 comprising a U shaped portion 120 adapted for fitting around step-bolt 112. U-shaped portion 120 is dimensioned to fit around step-bolt 112 and is provided with aligned apertures 122, 122' through which bolt 124 passes, in use. Nut 126 is provided for location at an end of bolt 124 and is tightened in position on bolt 124 to apply force to either side of U-shaped portion 120 to firmly locate the step-bolt engagement portion 116 in place around step-bolt 12.

Step-bolt adaptor 114 is further provided with a support portion 118 extending from step bolt engagement portion 116.

Support portion 116 is formed form a single piece of metal wire, cut to length and bent to into the required form.

Support portion is provided with a V-shaped portion 136. V-shaped portion 136 together with step-bolt 112 define an aperture 138 through which the karabiner (not shown) of a fall arrest system extends during use. Support portion 118 then extends around step-bolt 12 such that curved end portion 134 of support portion 118 contacts tower 10. Thus, step-bolt adaptor 114 is braced against tower 110, in use.

Thus, in use, step-bolt adaptor 114 is located such that U-shaped portion 120 of step-bolt engagement portion 116 extends around step-bolt 112. Step bold adaptor 114 is then oriented such that curved end portion 134 of support portion 118 contacts tower 112 and V-shaped portion 136 of support portion 18 extends below step-bolt 12. Bolt 124 locates through aligned apertures 122, 122' and nut 126 is tightened around bolt 124 to secure step-bolt engagement portion 116 firmly in place around step-bolt 112. Curved end portion 134 of support portion 118 will then be in located in contact with tower 110.

A karabiner (not shown) attached to a lanyard of a fall arrest system of a linesman working on tower 112 will be secured through aperture 138. Should the linesman fall, he would only fall as far as the length of the lanyard. On reaching the full extent of the lanyard, the karabiner would engage with the support portion 118 and be guided to the lowest point (shown as B in FIGS. 3 and 4) of the V-shaped portion 136 and an arrest force applied via the karabiner to the step-bolt adaptor 114.

This has the effect of controlling the site of application of the arrest force to an end of the step-bolt 112 attached to tower 110 i.e. the strongest portion of step-bolt 12.

Further, as step-bolt adaptor 114 is braced against tower 110, some of the arrest force applied to the step-bolt adaptor 114 will be passed through tower 110, thus minimising the arrest force being borne solely by step-bolt 12.

Although aspects of the present invention have been described with reference to the embodiment shown in the accompanying drawings, it is to be understood that the invention is not limited to the precise embodiments shown and that various changes and modifications may be effected without further inventive skill and effort.

The invention claimed is:

1. A step-bolt adaptor for engagement with an elongate step-bolt attached to a tower structure, the step-bolt adaptor comprising:
    a body having a step-bolt engagement portion for rigid engagement with the elongate step-bolt, the step-bolt adaptor comprising a U-shaped engagement member defining a portion for engagement with a shaft of the elongate step-bolt;
    a substantially planar support portion extending downwards from the step-bolt engagement portion, wherein the support portion is substantially parallel to the tower, and wherein the substantially planar support portion comprises an aperture, and wherein the step-bolt adaptor is releasably engageable with the elongate step-bolt, and wherein the step-bolt engagement portion is adapted to extend around the elongate step-bolt, and wherein the step-bolt engagement portion is further provided with securing means to frictionally secure the step-bolt adaptor to the elongate step-bolt, and wherein the securing means comprises aligned opposing apertures adapted to receive a bolt therethrough.

2. A step-bolt adaptor as claimed in claim 1, further comprising a bolt adapted to extend through the aligned opposing apertures of the securing means and a nut adapted to engage an end of the bolt so as to retain the bolt in position relative to the opposing apertures.

3. A step-bolt adaptor as claimed in claim 1, wherein the body comprises a single component.

4. A step-bolt adaptor as claimed in claim 3, wherein the single component is rectangular or square in cross-section.

5. A step-bolt adaptor as claimed in claim 1, wherein the substantially planar support portion comprises a fall arrest engagement surface.

6. A step-bolt adaptor as claimed in claim 5, wherein the fall arrest engagement surface is angled so that a portion of the fall arrest engagement surface closest to the tower structure is lower than a portion of the fall arrest engagement surface that is farthest from the tower structure.

7. A step-bolt adaptor as claimed in claim 1, wherein the step-bolt engagement portion is located at an end of the elongate step-bolt proximal to the tower structure with which the elongate step-bolt is engaged.

8. A step-bolt adaptor as claimed in claim 7, wherein the step-bolt engagement portion is in contact with the tower structure with which the elongate step-bolt is engaged.

9. A step-bolt adaptor as claimed in claim 1, wherein the substantially planar support portion comprises a V-shaped support portion.

10. A step-bolt adaptor as claimed in claim 9, wherein at least a portion of the V-shaped support portion is in contact with the tower structure with which the elongate step-bolt is engaged.

11. A step-bolt adaptor as claimed in claim 9, wherein the V-shaped support portion comprises a first part which is substantially parallel to the tower structure with which the elongate step-bolt is engaged, and a second part attached to the first part extends away from the tower structure to which the elongate step-bolt is engaged.

12. A step-bolt adaptor as claimed in claim 1, wherein the step-bolt engagement portion is located at an end of the elongate step-bolt distal to the tower structure with which the elongate step-bolt is engaged.

\* \* \* \* \*